United States Patent [19]
Vaughan et al.

[11] 3,988,561
[45] Oct. 26, 1976

[54] WELD-BONDED TITANIUM STRUCTURES

[75] Inventors: Robert W. Vaughan, Manhattan Beach; John F. Creedon, Santa Clara, both of Calif.

[73] Assignee: The United States of America as represented by the Administrator of the National Aeronautics and Space Administration, Washington, D.C.

[22] Filed: Jan. 2, 1975

[21] Appl. No.: 537,979

[52] U.S. Cl. .................................. 219/92; 219/118
[51] Int. Cl.² .................. B23K 11/10; B23K 11/18
[58] Field of Search .............................. 219/92, 118

[56] References Cited
UNITED STATES PATENTS

| | | | |
|---|---|---|---|
| 2,452,805 | 11/1948 | Sussenback | 219/92 X |
| 3,337,711 | 8/1967 | Garscia | 219/92 |
| 3,803,081 | 4/1974 | Lubowitz | 260/37 N |

Primary Examiner—J. V. Truhe
Assistant Examiner—David A. Tone
Attorney, Agent, or Firm—Howard J. Osborn; Robert Kinberg; John R. Manning

[57] ABSTRACT

Structurally stronger titanium articles are produced by a weld-bonding technique comprising fastening at least two plates of titanium together using spot-welding and curing an adhesive interspersed between the spot-weld nuggets. This weld-bonding may be employed to form lap joints or to stiffen titanium metal plates.

5 Claims, 3 Drawing Figures

WELD-BONDED TITANIUM STRUCTURES

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

Prior to the present invention, weld-bonding was limited primarily to aluminum alloy structures using an epoxy adhesive resin. Advancing technological requirements rendered weld-bonded aluminum alloy structures using epoxy adhesives unsuitable for temperatures beyond 450 K maximum. Thus, weld-bonding of titanium metal using a high temperature adhesive system are the materials currently used when the temperatures exceed 450 K.

High temperature adhesives, i.e. 500 to 650 K, which could be used for the weld-bonding applications are polyimides, polypyrrones, polybenziamidazole, polyquinoxalines, polyphenylquinoxalines, or polyimidazoquinazolines. Several problems arise from the use of these adhesives in conjunction with titanium weld-bonding techniques. All of the high temperature polymers which have been considered for adhesive systems are condensation cured and evolve gaseous products during the cure. The high void content of these adhesives may be overcome by applying pressure during cure of the adhesive. However, where the workpiece is extremely large, application of pressure to collapse the voids and extrude a small portion of resin from the bond joint may require a very large machine or may be impossible. Thus, adhesives which evolve only a small amount of gaseous by-products upon curing are preferred.

Because of the poor oxidative stability of titanium in air, the adhesive resin used in weld-bonding must be applied to the titanium surface within four hours after cleaning of the surface. This presents a problem for the fabricator in that he must clean the titanium surface to be bonded, apply the resin adhesive, and proceed with the weld-bonding before the adhesive resin becomes oxidized from the air. Thus, several fabrication steps are necessary within a specified time confinement.

U.S. Pat. No. 3,337,711 teaches a prior art method of weld-bonding two pieces of metal using a thermally, softenable adhesive. The patentee shunts the current between the metal layers to be bonded, causing the metal layers to heat and soften the adhesive resin. This method of weld-bonding is not applicable to titanium because of titanium oxidative instability. When titanium is welded, care is taken to prevent excessive heating of the titanium workpiece, and this is usually done by using refrigerated electrodes.

SUMMARY OF THE INVENTION

In the present invention, a polyimide prepolymer is applied to a portion of the titanium surface immediately after cleaning. The polyimide prepolymer may be applied in a sheet form or as a polyamide-acid which is later staged to the polyimide prepolymer form. Once the titanium surface has been coated with the polyimide prepolymer, the titanium workpiece may be set aside and weld-bonded at any subsequent time. Having applied the polyimide prepolymer to the cleaned titanium surface, the titanium surface is protected from air oxidation so that final fabrication of the workpiece is not urgent.

In order to avoid excessive material at the point of the spot-weld, portions of the adhesive at the spot-weld contact are masked from the surface.

Weld-bonding of the titanium is accomplished by placing the two adhesive coated surfaces together and applying spot-welds at the designated points. After the titanium plates have been joined by spot-welding, the entire workpiece is exposed to temperatures of approximately 375 to 450 K for a period of approximately thirty minutes. Titanium workpieces joined by this weld-bonding method exhibit improved resistance to fatigue failure.

DESCRIPTION OF THE PREFERRED EMBODIMENTS

Because titanium forms an oxide coating upon exposure to air, the titanium workpiece to be weld-bonded must be cleaned before application of the adhesive to the joint surface. Preparation of the titanium involves degreasing with a solvent followed by grit blasting and immersion in a mild acid bath. The acid is removed then by rinsing in distilled water, and the surface is dried by warm air. The treated surface must be primed with a solution of the adhesive within 2 hours after the acid treatment. Solvent in the adhesive may be driven off and the adhesive imidized by exposure to elevated temperatures for 20 to 30 minutes. Where the adhesive is in the form of a polyimide prepolymer film, the cleaned surface is primed with a thin solution of adhesive, and the polyimide prepolymer film is placed on the primed surface. Removal of the solvent from the primer and subsequent imidization is effected by exposure to elevated temperatures for fifteen to thirty minutes.

Adhesives used in the present process are disclosed in detail in U.S. Pat. No. 3,803,081 to Lubowitz. The disclosure of this patent is incorporated herein by reference. Finely divided aluminum powder is added to the varnish formulation to form a thixotropic paste which can be applied to the surface of the titanium prior to welding. In addition to the paste formation, the aluminum provides a material which will expand during the heat-cure of the resin, and thereby apply pressure against the titanium surfaces. This is particularly advantageous where a large piece of titanium is being spot-welded and clamping or pressing the large piece would be impractical. In this way, the aluminum assures good contact with the titanium surfaces and collapses any voids which may be present due to uneven application of the resin or other purely mechanical reasons.

Figure 2:
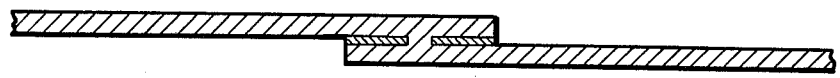
FIG. 2 is a cross-sectional side elevation taken through line 2—2 passing through the center spot-weld and showing the resin adhesive between the metal sheet.

By an alternate method of fabrication, a glass fabric cloth is cut to the pattern of the weld-bond joint, omitting the areas where the spot-welds will be. The cloth is impregnated with a solution of the adhesive resin and is air-dried to drive off the solvent. Next the prepreg cloth is heated for five minutes at 450 K to imidize the resin to provide a reinforced film or sheet having good tack and drape. These sheets are applied to the primed titanium surface and thermally treated to imidize the primer and to adhere the film to the surface. FIG. 2 shows a cross-section of the weld-bond product through spot-weld nugget 1 and adhesive 2.

ADHESIVE BOND ONLY

A polymeric adhesive composition was prepared by blending a polyimide precursor with a polyamide-imide precursor together with aluminum and fumed silica according to the following example.

EXAMPLE I

Meta-phenylene diamine in the amount of 170.0 g and 4,4'-diaminodiphenylsulfide in the amount of 67.9 g were dissolved in 400 ml of dimethylformamide in a round-bottomed flask fitted with a stirring apparatus and a nitrogen gas bleed. A slurry of nadic anhydride or 3,6-endomethylene-1,2,3,6-tetrahydrophthalic anhydride in the amount of 233.4 g dissolved in 252 ml of dimethylformamide was added slowly to the diamine mixture while controlling the solution temperature between 293 K and 298 K. After the last addition of the nadic anhydride slurry, stirring was continued for ten minutes, then a slurry of benzophenonetetracarboxylic acid dianhydride in 700 ml of dimethylformamide was added until all ingredients were combined at a temperature of 293 K to 298K. The material was stirred for two hours and then allowed to stand for thirty minutes under a nitrogen purge. This polyimide precursor resin was added to an amide-acid varnish produced by Amoco designated as AI-1137 and the resin mixture was blended with aluminum alloy powder and fumed silica in dimethylformamide solvent according to the following formulation.

TABLE I

| Constituents | Parts by Weight |
| --- | --- |
| Nadic Polyimide Precursor | 50 |
| AI-1137 (Amoco) | 50 |
| Aluminum Powder - Grade 101 (Aluminum Copr. of America) | 175 |
| Cab-O-Sil (fumed silica, Cabot Corp.) | 10 |
| Dimethylformamide | 150 |

Three titanium panels were prepared and coated with the above adhesive resin. One-half inch diameter holes were punched through the panels to coincide with primer bare spots as would be required for spot-welding. The panels were assembled in a bonding jig and loaded into a cold-press. Pressure of 700 Newtons/m$^2$ (100 psig) was applied, and the press platen temperature was raised to 575 K at the rate of 5.56 K per minute. Panels were press cured for one hour, removed from the press, and then oven cured for sixteen hours at 561 K. The resulting panels were tested statically at room temperature and provided an average breaking load of 19037N (4280 lbs.). Examination of the failed joints showed good flow of the adhesive.

WELD ONLY

Spot-welding of nine titanium plates were carried out on a Sciaky welding machine having the following settings:

| | | |
| --- | --- | --- |
| Tip Pressure | — | 18000 N (4000 lbs) |
| Tip Diameter | — | 12.7 mm (0.5-inch) |
| Gauge No. 1 | — | 97 N/m$^2$ (14 psig) |
| Gauge No. 2 | — | 234 N/m$^2$ (34 psig) |
| Squeeze Setting | — | 0.3 – 50 |
| Hold Setting | — | 0.75 – 50 |
| Weld Setting | — | 0.75 – 32 |
| Off Setting | — | 0.75 – 55 |
| Phase Shift Setting | — | 27 |
| Nugget Diameter | — | 7.6 mm (0.300-inch) |
| Current Delay | — | none |
| Recompression Delay | — | none |

WELD-BOND ONLY

Specimens for these tests were prepared in the following manner:

EXAMPLE II

Figure 1:
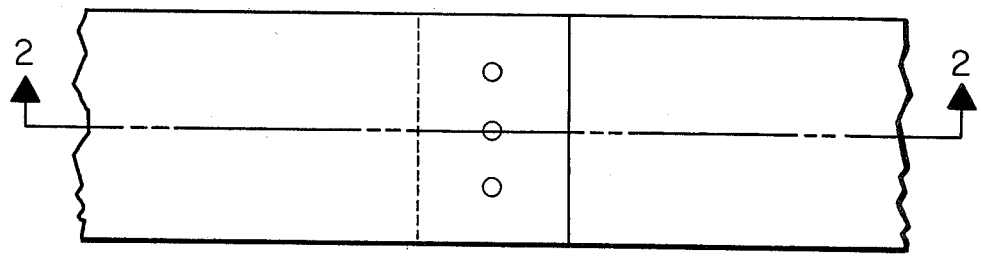
FIG. 1 shows a top elevation view of a lap-joint having three spot-welds.

Titanium alloy 6 Al 4V faying surfaces of lap-shear test panels were vapor degreased, grit blasted with 50 micron alumina and a water rinse. The panels were immersed in solvent for fifteen minutes at 294 K, water rinsed and dried at 339 K. Paper masks were applied for the spot-weld areas. An adhesive primer prepared according to the formulation in Example I, however, omitting the silica and aluminum powders, was applied by brush, dried in an air-circulating oven for fifteen minutes at 403 K, and imidized by thermal treatment for five minutes at 450 K. Paste adhesive prepared according to the formulation in Example I was splined onto the primed surface to provide a total thickness of 0.25 mm and dried and imidized by the same process as used for the primer. The specimens were assembled and spot-welded as shown in FIGS. 1 and 2, using the same settings and machine as in the WELD ONLY method. The specimens were cured then by heating in an oven to 589 K/minute followed by a sixteen hour cure at 589 K. The welded-only specimens were prepared identically to the weld-bonded specimens except the adhesive paste was omitted. Bonded-only panels were prepared as discussed previously.

Figure 3:
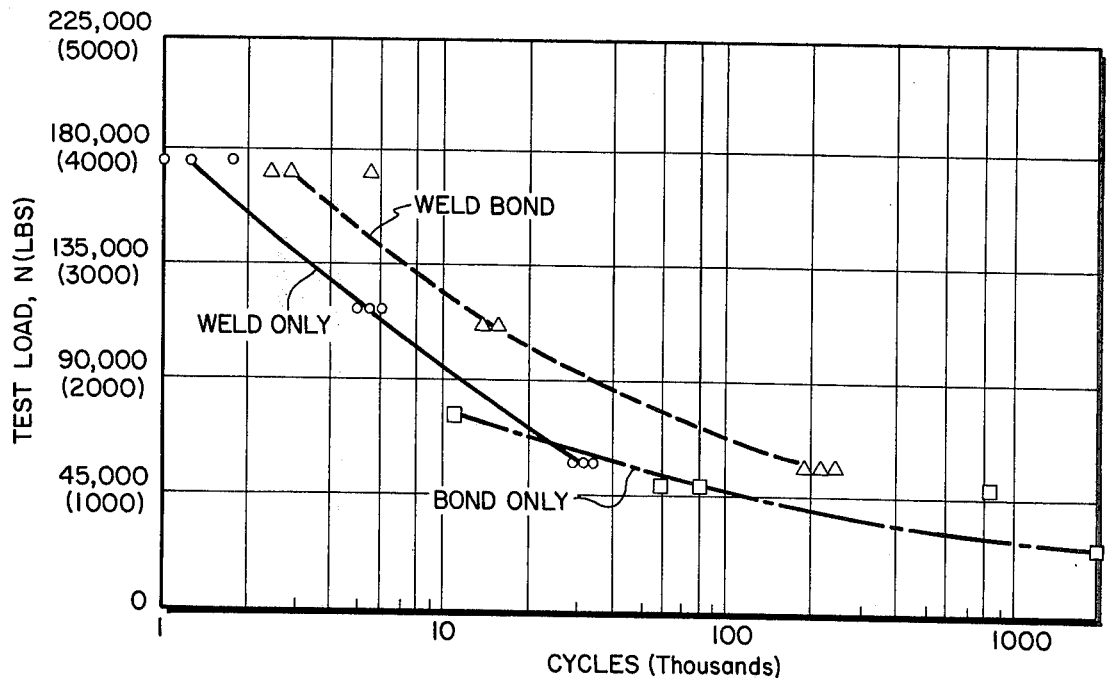
FIG. 3 is a graphic comparison of the fatigue failure of lap-joints under various loadings at room temperature.

Weld-bonded joints according to the present invention were statically and dynamically tested. Generally, weld-bonded joints showed approximately the same or better strength when statically tested after thermal aging at temperatures ranging from 21 K to 561 K as before thermal aging. More significantly, however, were the results obtained by the fatigue test. These results are shown in FIG. 3 of the drawing.

Fatigue tests involving three specimens of each type of joining at each of the three load-levels set forth in the following table were performed in a Sonntage fixed frequency, fixed wave form, and variable load fatigue tester. All of the specimens were loaded in a clevis-pin grip and cyclic loaded at 1800 cycles per minute (30Hz) at a load ratio of 0.1. Results in Table II which are plotted in FIG. 3 indicate a significant improvement in fatigue strength of the weld-bonded specimens over the other two methods of joining.

TABLE II

FATIGUE TEST RESULTS FOR WELD THROUGH PROCESS

| | Cycles at Failure (× 10$^3$) | | |
| --- | --- | --- | --- |
| Load Level, [a] % | Welded-Only | Bonded-Only | Weld-Bonded |
| | 1.0 | 1.0 | 5.5 |
| 60 | 1.8 | 11.0 | 2.5 |
| | 1.3 | 0.5 | 3.0 |

TABLE II-continued

FATIGUE TEST RESULTS FOR WELD THROUGH PROCESS

| Load Level,[a] % | Cycles at Failure (× 10³) | | |
|---|---|---|---|
| | Welded-Only | Bonded-Only | Weld-Bonded |
| 40 | 5.5 | 60.0 | 14.0 |
| | 6.0 | 81.0 | 14.0 |
| | 5.0 | 723.0 | 16.0 |
| 20 | 30.0 | (b) | 227.0 |
| | 33.0 | | 216.0 |
| | 31.0 | | 186.0 |

[a] Percent of failure load at room temperature from static tests.
[b] No failure before completion of 1 million cycles.

We claim:

1. A process for weld-bonding titanium comprising:
    A. applying a polyimide prepolymer adhesive in a predetermined pattern to the surface of at least two titanium plates whereby areas to be spot-welded are void of said adhesive;
    B. bringing said plates into contact with each other;
    C. spot-welding to join said plates; and
    D. heating said adhesive to effect cure of said adhesive and form a structurally strong weld-bonded layer.

2. A process according to claim 1 wherein aluminum powder filler is added to the polyimide adhesive.

3. A process according to claim 1 wherein fibrous reinforcing material is placed between said plates.

4. A process according to claim 1 wherein said adhesive is applied as a liquid.

5. A process according to claim 1 wherein said adhesive is a solid film.

* * * * *